May 19, 1964     J. C. CAST ETAL     3,133,485
WAX JET SHUTTER
Filed Dec. 27, 1962
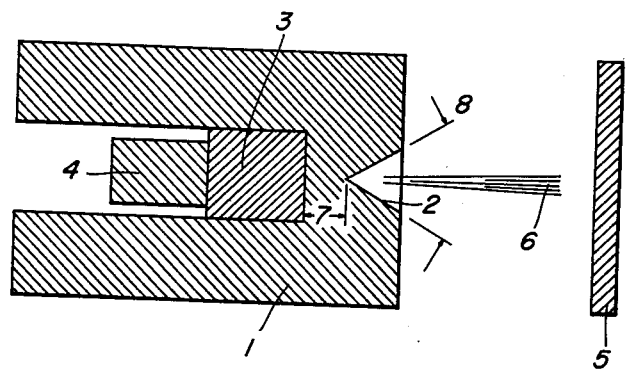
INVENTOR.
John C. Cast
Orville G. Winslow
BY

United States Patent Office 3,133,485
Patented May 19, 1964

---

3,133,485
WAX JET SHUTTER
John C. Cast, Irvington, Calif., and Orville G. Winslow, Los Alamos, N. Mex., assignors to the United States of America as represented by the United States Atomic Energy Commission
Filed Dec. 27, 1962, Ser. No. 247,773
5 Claims. (Cl. 95—53)

The present invention relates to high speed light shutters and, more specifically, to an explosively actuated high speed shutter which is particularly adaptable for use with high speed cameras.

In the art of high speed photography, cameras have been developed which require an extremely rapid method of light shuttering. One example of such a camera is the framing camera capable of a framing rate in excess of 3,000,000 frames per second, which is the subject of U.S. Patent 2,668,473 issued to Berlyn Brixner.

The use of explosively actuated shutters in order to attain rapid closure has been previously attempted. For example, U.S. Patent 2,403,730 issued to S. M. MacNeille discloses an explosively actuated high speed shutter. In this embodiment the detonation of the explosive generates a pressure which is directed so as to actuate a hinged shutter blade. The shutter closing times, in the order of milliseconds, have been found too slow for modern requirements.

Another means to explosively actuate a shutter closure is disclosed by U.S. Patent 2,732,777 issued to Berlyn Brixner. In this device the explosive shock wave is utilized to internally shatter an optically clear frangible glass block and thereby render it opaque. This device is extremely fast, on the order of 3 microseconds. However, this method entails the drawback of requiring a second firing window between the frangible block and the lens system in order to protect the high resolution lenses used in framing cameras. The addition of a second window materially detracts from the resolution of the system.

Another means for attaining rapid shutter closure is described in U.S. Patent 2,470,139 issued to A. W. Campbell. This method utilizes a cloud of smoke formed by the detonation of a high explosive in the immediate vicinity of the lens. The cloud of smoke results in obscuration of a window by the deposition of a layer of film of soot and carbon. While this method avoids the drawback of the Brixner method, it has been found to be too slow for the high speeds required in many modern techniques for photographing explosives. The cloud has been found to travel at the rate of about 1 mm./μsec. while the wax jet of this invention travels at about 5 mm./μsec. The present invention has been found to result in shutter closing times of a few microseconds.

The present invention relates to means for providing an extremely fast obscuration of a camera window. The means comprise a block of wax having a conical depression in one end and a high explosive at the other end. Upon actuating the explosive a high velocity jet of wax issues from the depression and impinges on the camera window. The jet is composed of material from which the block is made, liquefied by the heat from the detonated explosive. The liquid impinging on the window scatters over the entire face thereof, clings to it, and solidifies rapidly to obscure said window and prevent the film from receiving further impressions.

Accordingly, it is an object of this invention to provide a shutter closing mechanism useful in the high speed photography of explosions.

It is a further object of this invention to provide an explosively actuated means for shutter closing which results in a jet of wax impinging upon a camera window and rendering the window opaque to further light impressions.

FIGURE 1 is a sectional view of the structure embodying the invention.

A rectangular or cylindrical block of wax 1 having a conical depression 2 in one end is fitted with a high explosive 3 having detonator 4 in the other end, near the apex of the cone. The block 1 is placed close to the window 5 with which it is to be used so that the center line of the conical depression 2, when extended, will touch the window 5 at its center. The block may be placed to one side so that it will not interfere with the camera's line of sight to an object to be photographed. Two or more such blocks may be spaced peripherally around the camera window and actuated simultaneously.

When the camera has been actuated and the desired exposure obtained, the detonator 4 is exploded by suitable automatic means. Before the block 1 is disintegrated, a high velocity jet 6 issues from the apex of the conical depression and impinges on window 5.

The composition and dimensions of the wax may be varied drastically without affecting the usefulness of this type of shutter. The wax used for these devices may be a black wax, for example, a black dissecting pan wax manufactured by Central Scientific Company. An example of the flexibility of the composition of this wax is illustrated by the fact that the wax may be composed of 50 percent black pan dissecting wax and 50 percent mineral oil.

The types of explosives and detonators used is also flexible. An example of a suitable explosive is tetryl. Any electrical detonator actuated by a bursting bridge wire would be suitable (e.g., one produced by E. I. du Pont de Nemours & Co., Inc.). In order to synchronize the explosion at the wax block with the desired film exposure any of several methods may be used. Either an explosive or an electrical delay system may be used. An example of the latter is the General Radio time delay generator, type 1392A, which offers a choice of time delays from 1 microsecond to 1 second. A third method of obtaining the desired delay time is to place the wax blocks further from the window. Since the velocity of the jet is known, the distance which it should be placed can be calculated so that the wax will be impinged upon the window within a predetermined time after the film has received the impression from the explosive detonation.

The wax is melted and poured into a cylindrically shaped container and allowed to harden. The wax can then be removed from the container and machined to the desired shape such as that shown in FIGURE 1. An example of suitable dimensions would be 1½ inch diameter, 1½ inches long for a cylindrical block and black dissecting pan wax and ½ inch by ½ inch for the cylinder of high explosive. It has been found that dimension 7 may be varied over a large range. A distance of ⅛ inch is suitable. The angle 8 for the conical depression may also be selected from a wide range. Angles between 40 to 120° have offered comparable results, a difference of only 5% in the velocity of the wax having been observed. Since 82° is a standard angle for counter sinks, this is generally used. The actual depth of the conical depression is variable within wide limits. However, very small depths yield unsatisfactory operation. It has been found that depths greater than about ⅛ inch are suitable.

Although not critical to operation, it has been found desirable to place the block of wax at about 15 to 20° from the surface of the glass window. This has been done to minimize any possibility of shattering said glass window. Of course this window may be thickened and a greater angle could be tolerated without danger of fracturing the glass.

The explosive in the detonator should be inserted in the wax as indicated in FIGURE 1 in order to shield the optical path from the fire ball until the wax has been impinged on the firing window. The fact that the firing window is never at the image plane means that the light from the jets is not imaged on the film but dispersed and perhaps absorbed by non-reflecting tubes and light baffles in the optical system. In an actual shot the slight from the detonating explosive to be photographed that reaches the film is probably several hundred times as bright as the light from the wax shutter.

When multiple wax jets are used the wax jets should be aimed to hit the glass before they collide in order to attain the fastest possible closing time. A collision of the jets in air should be avoided if possible because the colliding shock waves generate a brighter light than the light from a single jet.

The utility of this method is demonstrated by the fact that tests have shown that if four jets are used, a 4-inch diameter firing window can be closed in 20 microseconds. Obviously, decreasing the size of the window will result in a corresponding decrease in the closure time.

From a consideration of the description and drawings it is apparent to one skilled in the art that the apparatus described my be varied without departing from the spirit and scope of the invention as hereinafter claimed.

What is claimed is:

1. A shuttering device comprising a transparent window, a mass of wax having a depression at one end and explosive means at the other end whereby actuation of said explosive means causes a high velocity jet of wax to issue from said depression and impinge upon said transparent window.

2. A shuttering device as in claim 1 wherein the depression is of a conical shape.

3. The device of claim 2 wherein the angle of the conical shape is between about 40° and 120°.

4. A shuttering device as in claim 3 wherein the depth of the depression exceeds about 1/8 inch.

5. Means for providing a rapid obscuration of a camera window comprising a camera window, a plurality of wax blocks disposed evenly around the periphery of said window, said blocks being out of the line of sight between the film and the object to be photographed and shaped so that there is a conical depression in the end nearest the camera window, a space containing explosive means at the opposite end, and means for detonating said explosive.

No references cited.